United States Patent [19]

Sumiyoshi et al.

[11] Patent Number: 4,588,430
[45] Date of Patent: May 13, 1986

[54] METHOD OF MANUFACTURING A GLASS PRODUCT AND RESULTING PRODUCT

[75] Inventors: Hiroji Sumiyoshi, Sagamihara; Makoto Maeda, Tama; Takashi Aoki, Tokyo, all of Japan

[73] Assignee: Sony Corporation, Tokyo, Japan

[21] Appl. No.: 729,883

[22] Filed: May 1, 1985

Related U.S. Application Data

[63] Continuation of Ser. No. 533,668, Sep. 19, 1983, abandoned.

[30] Foreign Application Priority Data

Sep. 25, 1982 [JP] Japan ............... 57-167320

[51] Int. Cl.⁴ ............................................ C03B 23/24
[52] U.S. Cl. ........................................ 65/56; 65/42; 65/70; 313/477 R
[58] Field of Search ............... 65/36, 42, 56, 70; 313/447 R

[56] References Cited

U.S. PATENT DOCUMENTS 2,822,646  2/1958  Krefft .................... 65/42
3,615,326  10/1971  Levin ..................... 65/56
3,819,348  6/1974  Murray ................... 65/36
3,839,002  10/1974  Johannes et al. ......... 65/42

FOREIGN PATENT DOCUMENTS 2657224  6/1978  Fed. Rep. of Germany ......... 65/42
 830762  3/1960  United Kingdom ............... 65/42

Primary Examiner—Robert Lindsay
Attorney, Agent, or Firm—Hill, Van Santen, Steadman & Simpson

[57] ABSTRACT

A method of manufacturing a glass product, in which a symmetrical glass member same in shape as a good made by combining a plurality of glass products is molded once and then the symmetrical glass member is cut to provide the plurality of glass products.

4 Claims, 18 Drawing Figures

METHOD OF MANUFACTURING A GLASS PRODUCT AND RESULTING PRODUCT

This is a continuation of application Ser. No. 533,668, filed Sept. 19, 1983 now abandoned.

BACKGROUND OF THE INVENTION

1. Field of the Invention

The present invention relates generally to a method of manufacturing a glass product and is directed more particularly to a method of manufacturing an asymmetrical glass panel used in, for example, a flat type cathode ray tube.

2. Description of the Prior Art

At present, there has been proposed such a flat type cathode ray tube in which as shown in FIGS. 1 and 2 an electron gun is located to extend in the horizontal or vertical direction along the surface direction of the phosphor screen so as to make the cathode ray tube flat.

In FIG. 1 which is a plan view of the flat type cathode ray tube and in FIGS. 2A to 2D which are each a cross-sectional view taken along the line II—II in FIG. 1 and show different cathode ray tubes, reference numeral 1 generally designates the flat type cathode ray tube and 2 its panel portion.

FIG. 2A shows such a case where the panel portion 2 is divided into two panel members 2a, 2a which are substantially the same in configuration with respect to the vertical plane passing through a line VL, while FIG. 2B is the case that the panel portion 2 is divided into two panel members 2a, 2b which are different with each other in configuration with respect to the vertical plane including the line VL.

As shown in FIG. 3A, one of the divided panel members i.e. panel member 2a has a U-shaped cross-section, its panel surface is curved in one direction, it is symmetrical with respect to the vertical plane passing through a line a—a (which corresponds to the line II—II in FIG. 1) but it is asymmetrical with respect to the vertical plane passing through a line b—b perpendicular to the line a—a. In case of FIG. 2B, although the panel member 2a is approximately same as that 2a of FIG. 2A, as shown in FIG. 3B, the other panel member 2b has a U-shaped cross-section and its panel surface somewhat flat or approximately straight line shaped, it is symmetrical with respect to the vertical plane including the line a—a but asymmetrical with respect to the vertical plane including the line b—b. FIG. 2C shows a case where the panel portion 2 is divided into a panel member 2a' which is substantially the same as that 2a shown in FIG. 2A in shape but somewhat deeper than the latter in inner height (refer to FIG. 3C) and into a plate-shaped panel member 2b' (refer to FIG. 3D). FIG. 2D shows a case where the panel portion 2 is not divided and is of a unitary shape as shown in FIG. 4.

In FIGS. 1 and 2, reference numeral 3 denotes a phosphor screen, 4 a funnel portion, 5 an electron gun, 6 welding portions along which the divided panel members 2a, 2b and 2a', 2b' or panel portion 2 and the funnel portion 4 are respectively made together by crystallizing a vitreous solder glass and 7 which is an anode button through which a high voltage is applied to the cathode ray tube.

As the flat type cathode ray tube, it is an important matter to make its panel portion 2 flat. Although the panel portion 2 of unitary or integral structure can achieve the purpose to make the panel portion 2 flat, it is rather difficult to manufacture the panel portion 2 of integral structure. Firstly, according to the method of molding the panel portion 2 of the integral structure by using the metal press, since the bottom mold thereof is deep, if the temperature of the glass gob is selected higher than that of a glass gob used to make ordinary molded products, the raw glass material can not reach the top end of the bottom mold and the product with a thin thickness is difficult to be made. The fact that the increase in temperature of the glass gob i.e. the increase in the metal mold easily causes the surface of the metal mold to be chapped (including oxidization), so that the inner and outer surfaces of the panel portion thus made are roughened. It is rather easy to grind or polish the outer surface of the panel portion but it is difficult to grind or polish the inner surface of the panel portion and hence it requires much work. Accordingly, in case of the panel of a cathode ray tube of very flat type, since the roughess on the inner surface thereof influences or affects on the permeability of light, such a panel, namely panel of integral type and deep structure is not suitable for massproduction.

In case of the glass panel portions 2a, 2b and 2a' shown in FIGS. 3A, 3B and 3C, they are all asymmetrical with respect to the vertical plane including the line b—b. Thus, when the glass panels with such configuration are made directly by the press mold, there may occur such a problem that after the press mold of glass by a metal mold, owing to the anisotropy in the thermal distortion of the product upon cooling, the dimensional error is large, scattering appears in its quality, hence its productivity is poor and its manufacturing cost is high.

In general, it is said that a body with a dish-shape and symmetrical with respect to two planes perpendicular to each other, a body with a shape symmetrical with respect to an axis or a point, or body with a shape similar to the foregoing is easily made and the productivity thereof is good.

OBJECTS AND SUMMARY OF THE INVENTION

Accordingly, it is an object of the present invention to provide a method of manufacturing a glass product free from defects inherent to the prior art.

It is another object of the present invention to provide a method of manufacturing a glass product which is good in productivity.

It is a further object of the present invention to provide a method of manufacturing a glass product which is asymmetrical.

According to an aspect of the present invention, there is provided a method of manufacturing a glass product which comprises the steps of:

molding once a glass product of a symmetrical shape by combining a plurality of asymmetrical glass products; and cutting said glass product of a symmetrical shape to provide said plurality of asymmetrical glass products.

The other objects, features and advantages of the present invention will become apparent from the following description taken in conjunction with the accompanying drawings through which the like references designate the same elements and parts.

DESCRIPTION OF THE PREFERRED EMBODIMENTS

The present invention will be hereinafter described with reference to the attached drawings.

Figure 1:
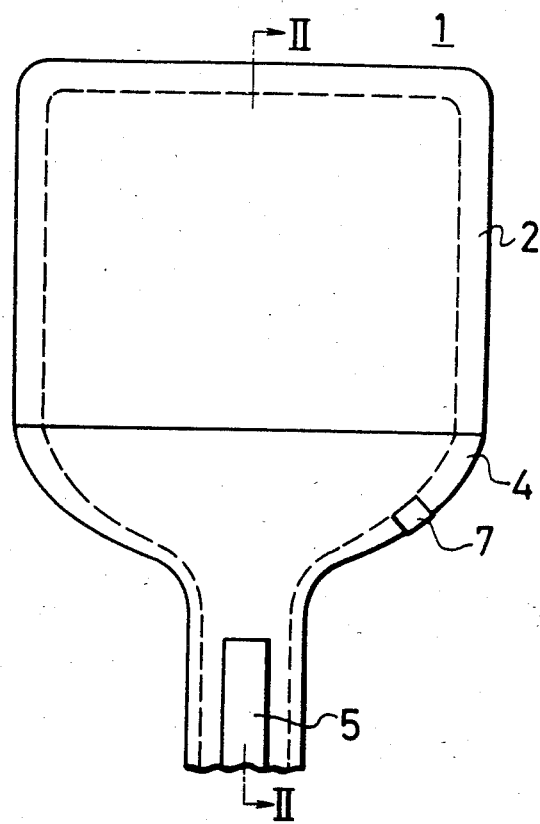
FIG. 1 is a plan view showing a flat type cathode ray tube in which a glass panel portion is employed.

With reference to FIGS. 5 to 8, an example of the method of manufacturing a glass product according to the present invention will be described hereinafter, which is applied to, by way of example, the case that the glass panel member 2a of the cathode ray tube 1 (refer to FIGS. 1, 2 and 3) is manufactured.

Figure 5:
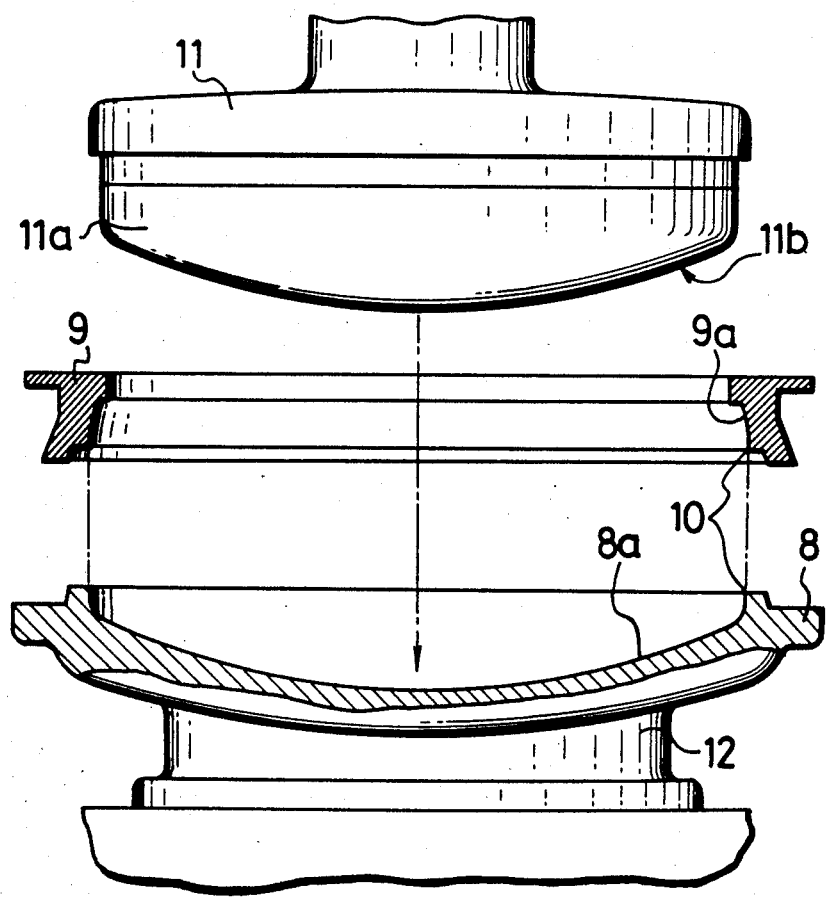
FIGS. 5, 6 and 7, inclusive, are respectively front views showing partially in cross-section the essential portions of an example of the device illustrating the method of manufacturing a glass product according to the present invention.

In FIG. 5, reference numeral 8 designates a bottom mold of an inner wall dish type which will constitute the bottom portion of a female mold. On the bottom mold 8, will be located a shell ring 9. The total shape of inner walls 8a and 9a of the bottom mold 8 and the shell ring 9 determine the shape of the outer wall of a glass panel member or, in this example, the glass panel member made by coupling two of the same glass panel members 2a which are symmeterical with respect to two vertical planes perpendicular with each other and including two lines a'—a' and b'—b' (refer to FIG. 8). Thus, the female mold is constructed by the bottom mold 8 and the shell ring 9. In this case, the inner wall 9a of the shell ring 9 is so formed that, as shown in FIG. 5, it is curved inwardly or to the center axis thereof gradually from a junction edge 10 between the inner walls 8a and 9a of the bottom mold 8 and the shell ring 9, and the inner wall 8a of the bottom mold 8 is also gradually curved inwardly from the junction edge 10.

In FIG. 5, reference numeral 11 designates a plunger which has a member 11a to serve as a male mold and the member 11a has an outer curved surface or wall 11b corresponding to the combined inner walls 8a and 9a of the combined bottom mold 8 and shell ring 9. This outer curved surface 11b of the plunger 11 determines the shape of the inner wall of the afore-said glass panel member (refer to FIG. 8).

Figure 6:
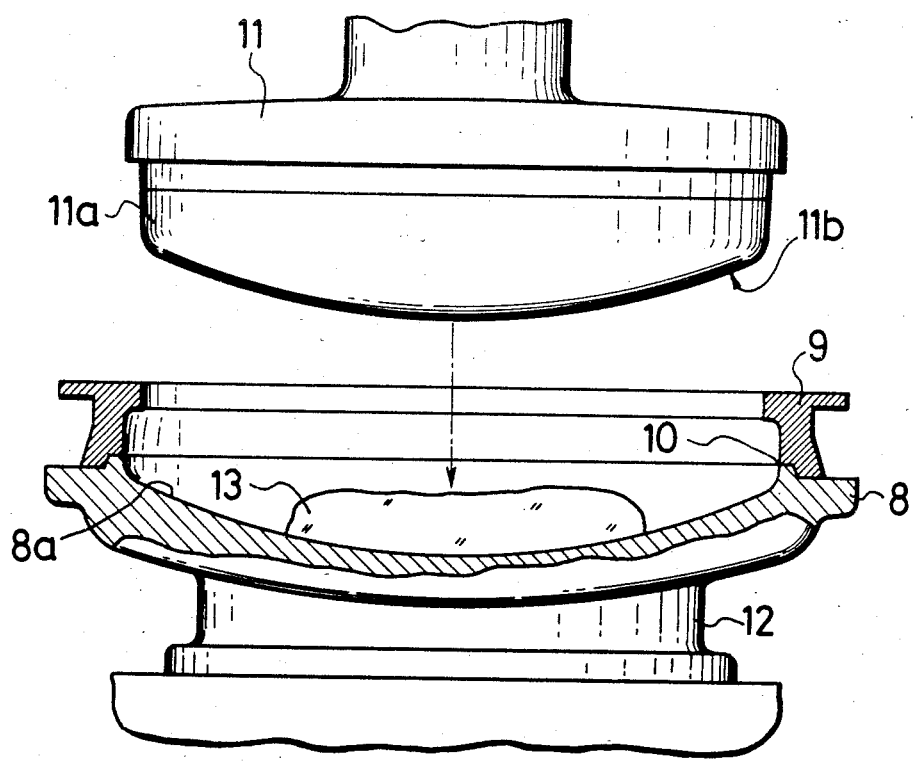
Figure 7:
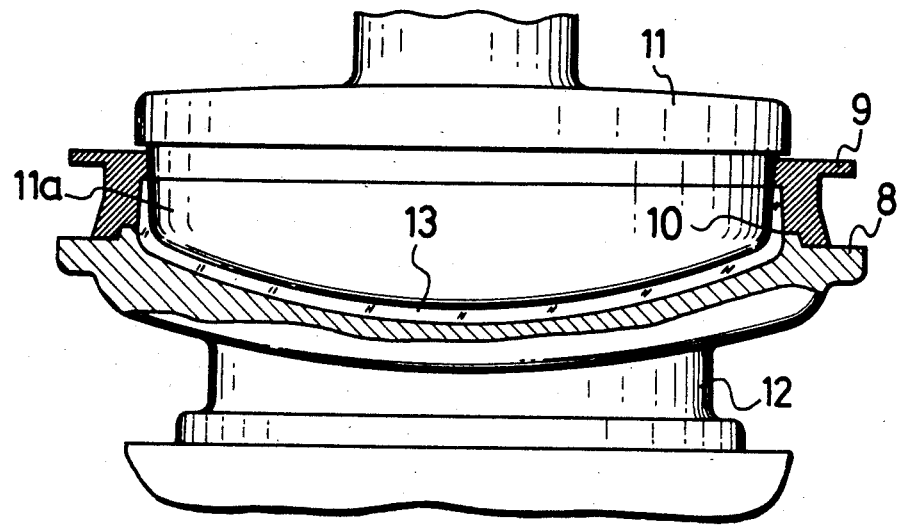
Figure 8:
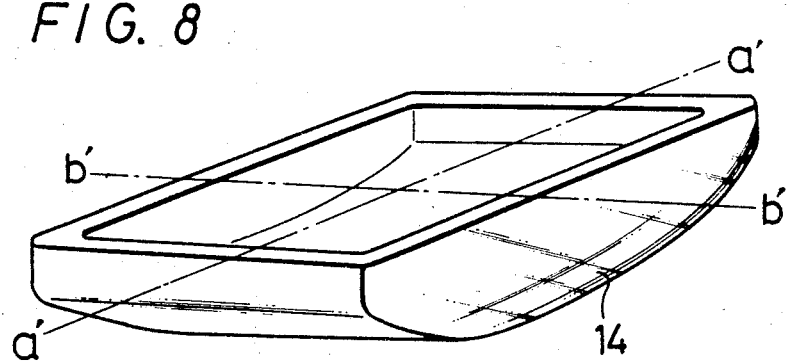
FIG. 8 is a perspective view showing a glass panel member made by the example of the method of the present invention.

The bottom mold 8 is mounted on a base 12 at a predetermined position and the shell ring 9 is attached onto the bottom mold 8. Then, molten glass 13 of a given amount is located on the inner wall 8a of the bottom mold 8 as shown in FIG. 6. Next, as shown in FIG. 7, the plunger 11 is moved down to push the molten glass 13 by the member 11a so that the molten glass 13 fills the cavity of a given configuration defined by the inner walls 8a and 9a of the bottom mold 8 and the shell ring 9 and the outer surface 11b of the plunger 11. When the molten glass 13 becomes cool and then removed from the female mold, the glass press mold is finished, by which a glass panel member 14 is obtained as shown in FIG. 8. As described above, the glass panel member 14 has the predetermined inner and outer surfaces which are both symmetrical with respect to two vertical planes including the lines a'—a' and b'—b'.

Figure 3A:
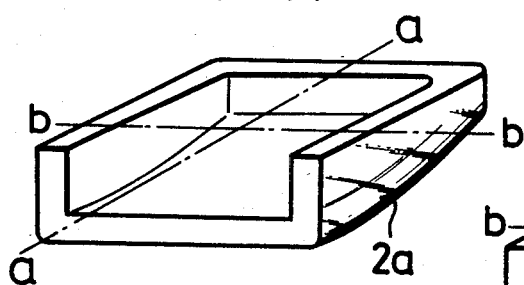
FIGS. 3A to 3D are each a perspective view showing a divided glass panel member.
Figure 3B:
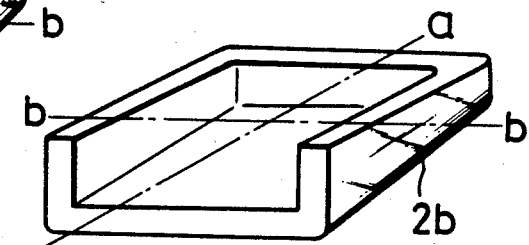
Figure 3C:
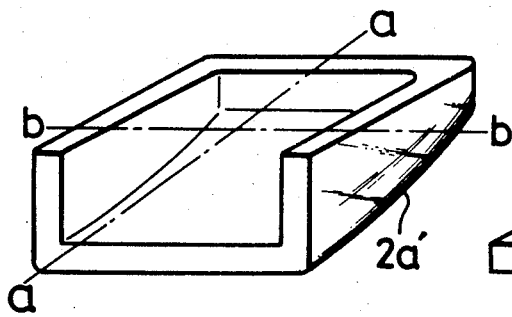
Figure 3D:
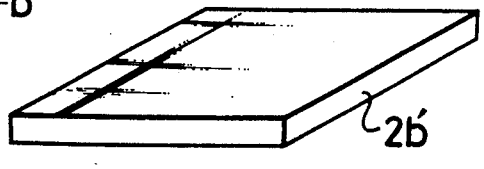
Figure 9:
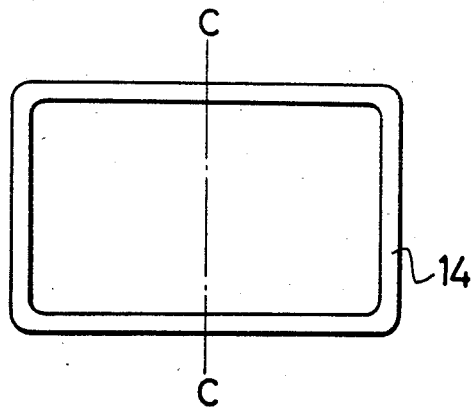
FIG. 9 is a plan view of FIG. 8 showing the line along which the glass panel member shown in FIG. 8 is cut.

Then, the glass panel member 14 thus made as shown in FIG. 8 is cut by a glass cutter or laser cutter (not shown) along the vertical plane passing through a center line c—c shown in FIG. 9 which corresponds to the line b'—b' in FIG. 8 to form two glass panel members same in shape simultaneously each of which is same as that shown in, for example, FIG. 3A. The glass panel members 2a thus made are used to form the flat type cathode ray tube 1.

As described above, according to the above example of the present invention, the glass panel member 2a which is asymmetrical with respect to one of the two planes perpendicular to each other can be obtained by carrying out once the glass press mold which is same as the prior art technique to make a symmetrical glass product. Thus, the invention can produce the asymmetrical glass panel 2a easily and is good in productivity.

Figure 10:
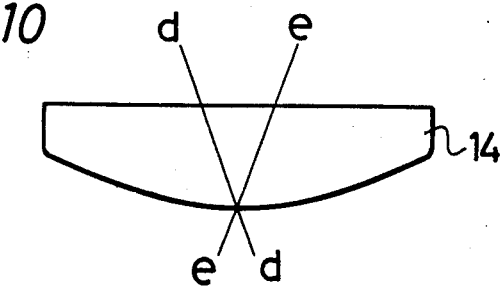
FIG. 10 is a schematic diagram showing the essential part of another example of the invention.

Further, even in case where a combined glass panel member symmetrical with respect to two planes perpendicular with each other can not be obtained by merely coupling two glass panel members, it is possible that a glass panel member 14 including somewhat superfluous portion and symmetrical with respect to two planes perpendicular with each other is made once and then is cut along a plurality of cutting planes, for example, planes d—d and e—e shown in FIG. 10 to provide a desired shape of glass panel members.

Figure 2A:
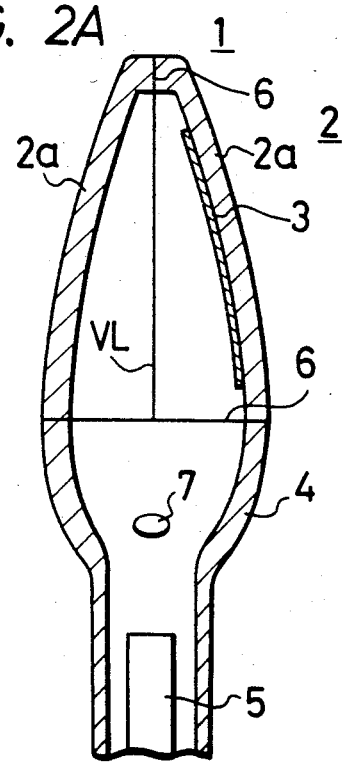
FIGS. 2A to 2D are each a cross-sectional view taken along the line II—II in FIG. 1.
Figure 2B:
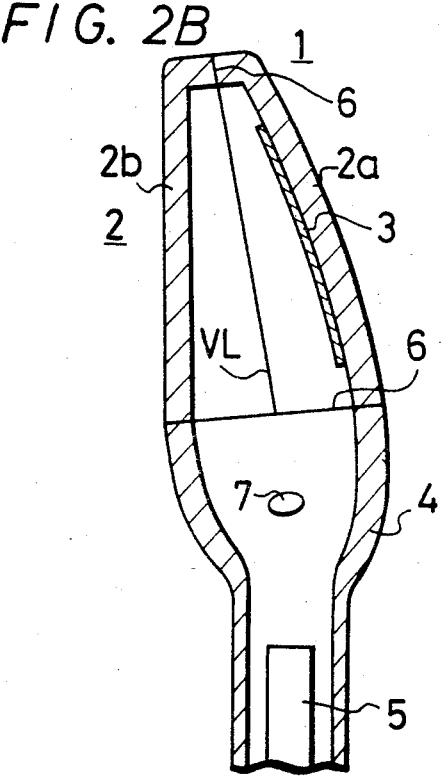
Figure 2C:
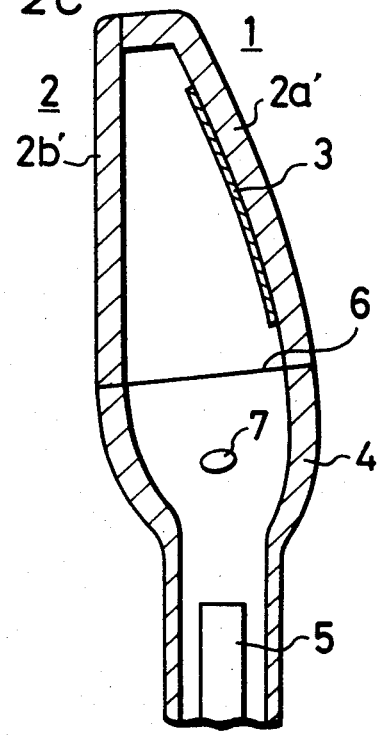
Figure 11:
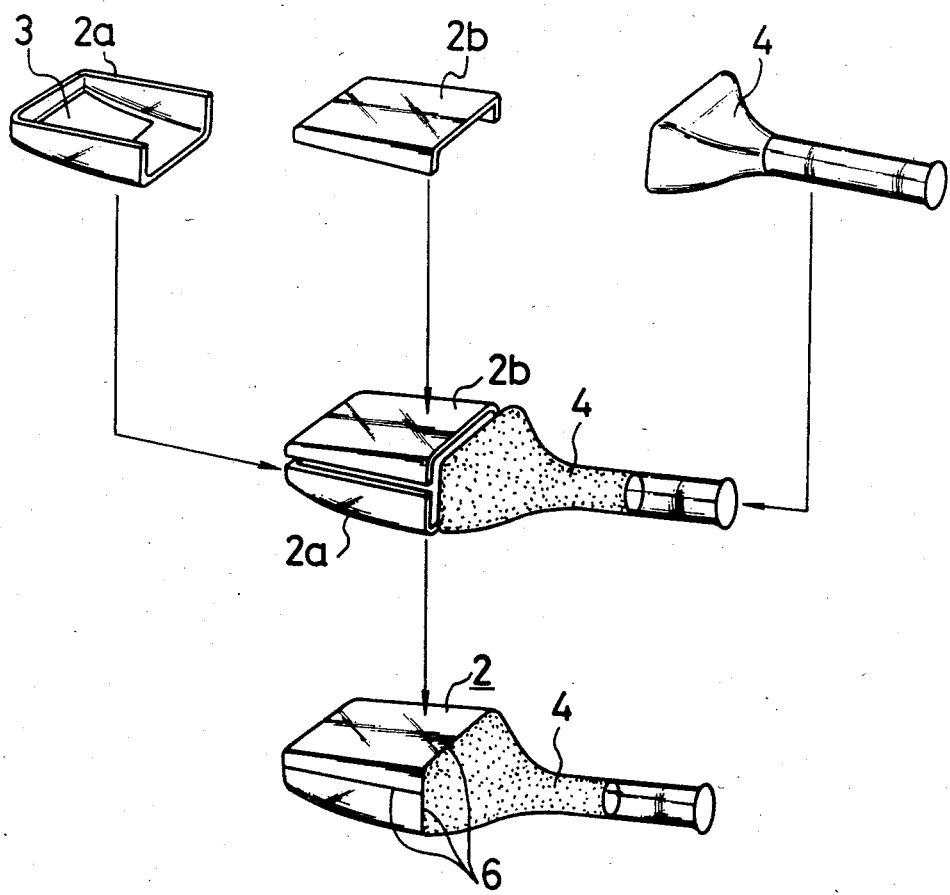
FIG. 11 is a perspective view showing the assembling process of a flat type cathode ray tube.

When as shown in FIG. 2B, such a flat type cathode ray tube in which the surface of its front panel is made flat is manufactured, a glass panel member 14 with the configuration corresponding to that of the panel member made by coupling two front panel members 2b is produced and then is cut along the planes as shown in FIG. 10 to provide a desired shape of panel member 2b. Two of the other glass panel members i.e. screen panel members 2a are coupled to provide a glass panel member 14 and then this glass panel member 14 is cut as shown in FIG. 10 to provide a desired shape of screen panel member 2a. Then, the screen panel member 2a and the front panel or mating panel member 2b thus made are frit-sealed to the funnel portion 4 previously made as shown in FIG. 11. Thereafter, an electron gun and so on are assembled thereto to thereby easily manufacture a desired shape of the flat type cathode ray tube.

Figure 2D:
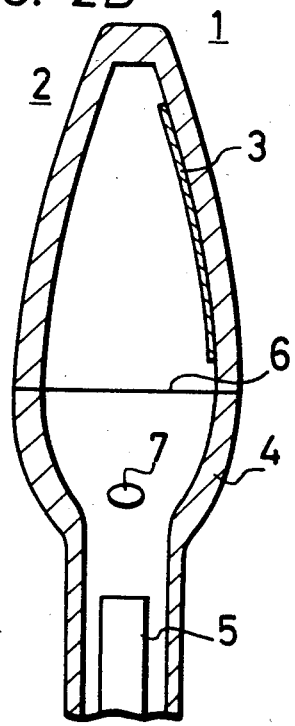
Figure 4:
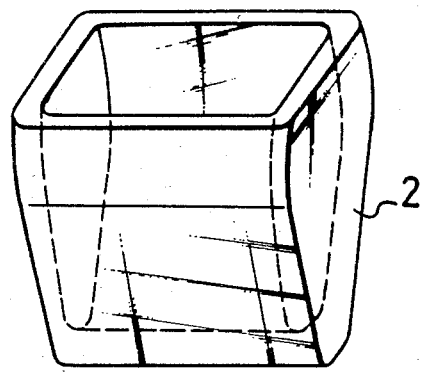
FIG. 4 is a perspective view showing the panel portion shown in FIG. 2D.
Figure 12:
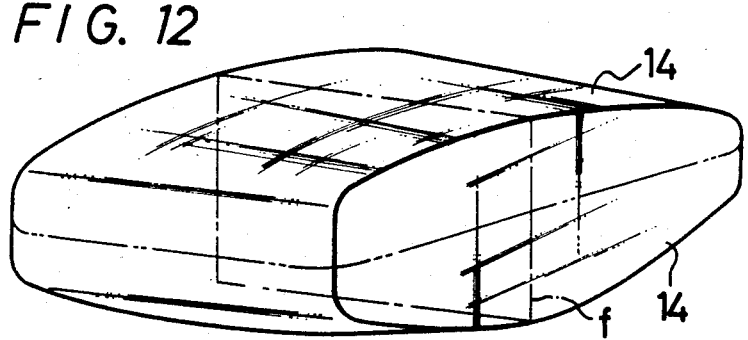
FIG. 12 is a perspective view showing the essential part of a further example of the invention.

Further, when the flat type cathode ray tube such as shown in FIG. 2D is manufactured, two glass panel members 14 such as shown in FIG. 8 are prepared, their open end sides are overlapped as shown in FIG. 12, then welded or frit-sealed and the welded body is cut along its center line f. Thus, the panel portion 2 shown in FIG. 4 can be made, easily. Then, if the panel portion 2 is frit-sealed to the funnel portion 4, the flat type cathode ray tube shown in FIG. 2D can be manufactured.

According to the above examples of the invention, the symmetrical glass panel members 14 are once made and then two glass panels 2a or 2b are respectively provided therefrom. However, it will be easily understood that this invention is not limited to the manufacturing of two glass panel members 2a or 2b but to such a case where a symmetrical glass member, which is formed by combining a plurality of, for example, 3 or 4 glass goods, is made once and then cut to manufacture glass goods with the same effects.

Further, in the above examples, the glass panel members 14 each has such a configuration which is symmetrical with respect to two planes perpendicular to each other, but the glass panel members 14 may have such a configuration that it is symmetrical with respect to a point or the like.

In the above description of the invention, the term "cut" is used. When glass products are combined and then welded, the cut surface itself may be used as it is. However, when the glass products are frit-sealed, the end surface thereof may be ground or polished, if necessary.

As set forth above, according to the method of manufacturing a glass product of the present invention, a glass product which is asymmetrical cah be manufactured easily and the productivity thereof is excellent.

The above examples of the present invention are applied to the case that the flat type cathode ray tube, especially its panel portion is made, but the present invention can be of course applied to manufacturing asymmetrical glass goods of various kinds with the same effects.

The above description is given on the preferred embodiments of the invention, but it will be apparent that many modifications and variations could be effected by one skilled in the art without departing from the spirit or scope of the novel concepts of the invention, so that the scope of the invention should be determined by the appended claims only.

We claim as our invention:

1. A method of manufacturing a glass envelope for a flat type cathode ray tube having a screen panel, a mating panel, and a funnel portion extending from said panels, at least one of said panels having an asymmetrical shape, comprising the steps of:
   molding in a single molding operation a glass product having a symmetrical shape;
   dividing said glass product so as to provide one of said panels having an asymmetrical shape, and
   sealing said screen panel, said mating panel and said funnel portion together to form said envelope.

2. A method of manufacturing the glass components of a glass envelope for a flat type cathode ray tube comprised of a screen panel and a mating panel at least one of which has an asymmetrical shape, the steps of
   molding in a single molding operation a glass product having a symmetrical shape; and
   dividing said glass product after molding by severing the molded product along planes which intersect at less than a right angle with each other to provide said panel having an asymmetrical shape for mating assembly with the other panel.

3. A method of manufacturing an asymmetrical glass panel of a high degree of accuracy which comprises the steps of:
   molding a glass member of a symmetrical shape including a flat face;
   cooling said member to accurate dimensions; and
   dividing said member along at least one line which is at other than a right angle to said flat face to provide said accurate asymmetrical panel without distortion.

4. An asymmetrical glass panel member of accurate configuration constructed by the method of cutting it from a previously molded and cooled symmetrical member along at least one plane which is at an angle to the horizontal and vertical planes of said member.

* * * * *